(12) United States Patent
Li et al.

(10) Patent No.: US 7,949,298 B2
(45) Date of Patent: May 24, 2011

(54) TEACHING MATERIAL HAVING IDENTIFICATION UNIT AND TEACHING-MATERIAL COMMUNICATION SYSTEM

(76) Inventors: Ming Zhong Li, Zhongli (TW); Ming Chang Li, Zhongli (TW)

( * ) Notice: Subject to any disclaimer, the term of this patent is extended or adjusted under 35 U.S.C. 154(b) by 1042 days.

(21) Appl. No.: 11/798,751

(22) Filed: May 16, 2007

(65) Prior Publication Data

US 2008/0287152 A1 Nov. 20, 2008

(51) Int. Cl.
*H04H 20/71* (2008.01)
(52) U.S. Cl. .............. 455/3.05; 455/3.01; 455/3.06; 455/419; 455/420; 455/41.2; 455/500; 455/502; 455/518; 455/519; 434/350; 434/351; 434/365; 434/429; 725/24; 715/203; 715/733; 715/734; 715/735; 715/736; 715/748; 715/751
(58) Field of Classification Search .............. 455/3.01, 455/3.05, 3.06, 418–420, 41.2, 500, 502, 455/517–519, 550.1, 556.1, 556.2, 90.1–90.2; 434/322, 335, 336, 350–352, 365, 428–430, 434/433; 725/24, 62–71; 715/200–208, 715/733–736, 740–742, 748–760
See application file for complete search history.

(56) References Cited

U.S. PATENT DOCUMENTS

| 6,042,383 | A  | * | 3/2000 | Herron | 434/238 |
| 6,334,779 | B1 | * | 1/2002 | Siefert | 434/322 |
| 6,537,073 | B2 | * | 3/2003 | Zhang | 434/236 |
| 7,584,432 | B1 | * | 9/2009 | Oakley et al. | 715/761 |
| 2007/0099163 | A1 | * | 5/2007 | Tseng | 434/350 |

* cited by examiner

*Primary Examiner* — Tuan A Tran

(57) ABSTRACT

The present invention provides a teaching material having an identification unit and a teaching-material communication system. The teaching material having the identification unit comprises at least one learning unit and at least one identification unit. The teaching-material communication system comprises at least one transmitting end system and at least one receiving end system. The transmitting end system comprises an input module and a transmission module. The receiving end system comprises a receiving module, a second identification process module, and a second communication module. By the at least one transmitting end system and the at least one receiving end system of the teaching-material communication system, at least one transmitter and at least one receiver can communicate with the learning unit of the teaching material having the identification unit.

21 Claims, 4 Drawing Sheets

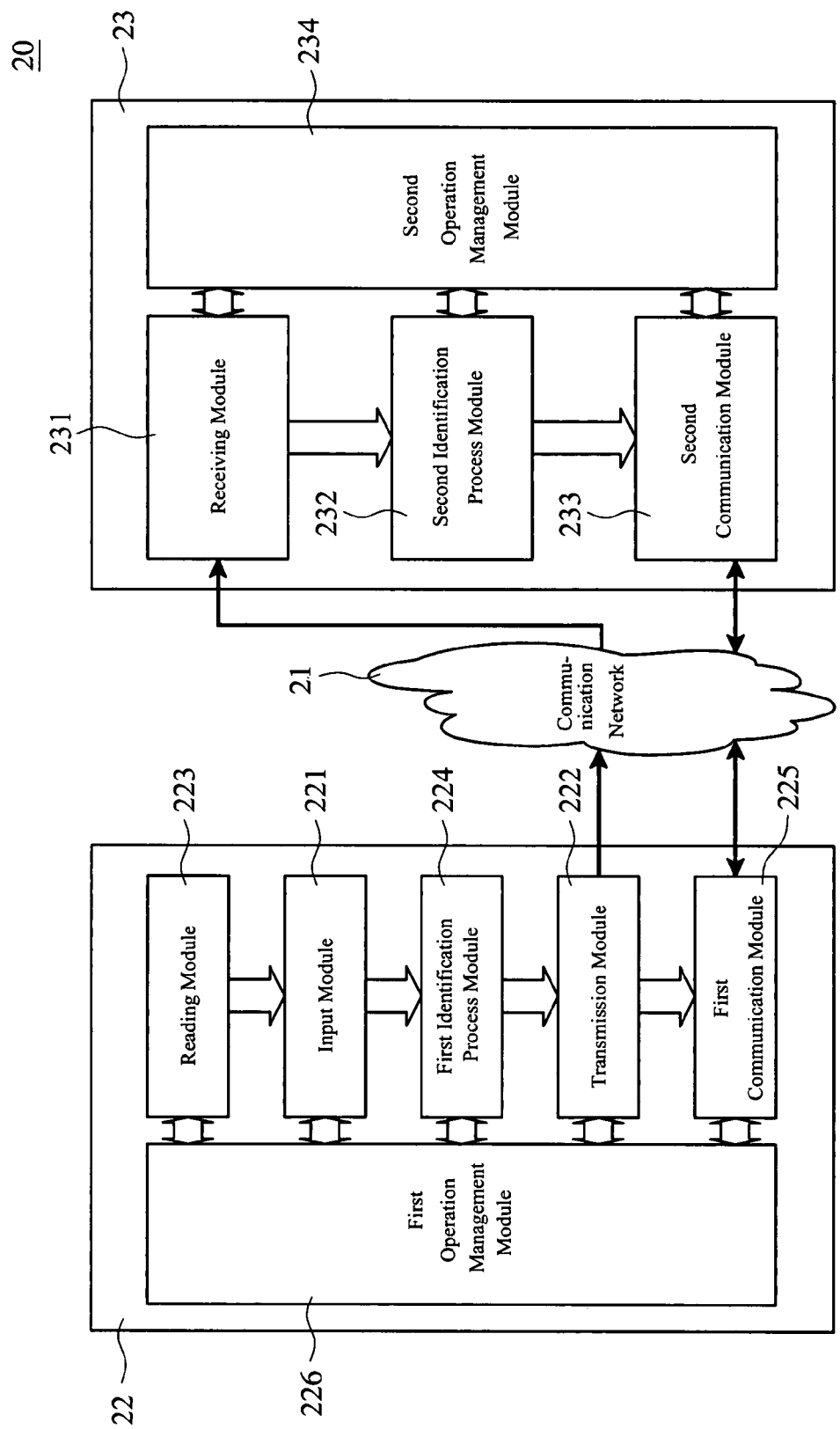

TEACHING MATERIAL HAVING IDENTIFICATION UNIT AND TEACHING-MATERIAL COMMUNICATION SYSTEM

BACKGROUND OF THE INVENTION

1. Technical Field

The present invention relates to a teaching material having an identification unit and a teaching-material communication system. More particularly, the present invention permits at least one transmitter and at least one receiver to use the teaching-material communication system to communicate with a learning unit of the teaching material having the identification unit.

2. Description of Related Art

For enhancing the efficiency of both learning and teaching, it is critical for a learner and a teacher to be able to discuss the contents of a teaching material easily and quickly, so that the learner may address his/her questions to the teacher efficiently, and the teacher may perceive the learner's questions precisely.

Though the various teaching materials currently provided in the market may be used as auxiliaries of teaching and learning, the contents of the teaching materials and the teaching systems thereof are not well integrated. As a result, the learner and the teacher could not have unit-based and systematized communication therebetween. Consequently, the communication related to the contents of the teaching materials could not be efficiently simplified, and thus the efficiency of learning and teaching could not be improved efficiently.

In the following discussion, teaching with printed teaching materials will be taken as an instance. During teaching, when a teacher intends to designate a particular learning unit as a teaching auxiliary, or when a learner wants to address some questions related to a particular learning unit, both of them can only find out the contents of the learning units designated by the other side through oral communication. Such a problem of not being able to quickly and clearly point out the contents of the designated learning units can be even more aggravated under the circumstances that distance learning is put into practice. Further, when more learning units are involved in the communication, the learner and the teacher have to spend excessive time and to devote lots of energy to confirm the correct scope of the designated teaching materials, and they cannot ask or explain any questions related to the learning units of the teaching materials directly and efficiently.

On the other hand, teaching with digital teaching materials will be taken as another instance in the following discussion. The learning units of a conventional digital teaching material are typically presented in the form of files or WebPages, and there are identification unit data of the learning units stored at the back end of the system. However, since the identification unit data are originally designed for the purpose of system identification but not for assisting the learners and teachers in communicating mutually, they are typically disposed at the back end of the system and thus the general learners and teachers who don't have technical backgrounds cannot identify and access the identification data. Meantime, the existing teaching systems do not support the learners and teachers to identify and access the identification data of the learning units. Thus, unit-based and systematized communication between the learners and the teachers cannot be conducted directly; hence digital teaching materials have the same disadvantage as the printed teaching materials.

SUMMARY OF THE INVENTION

To remedy the aforesaid problems, the present invention provides a teaching material having an identification unit and a teaching-material communication system. Thereby, when a transmitter and a receiver communicate with each other about the learning units of the teaching material having the identification unit, the transmitter can quickly and clearly designate a learning unit to the receiver by operating the teaching-material communication system, while the receiver can quickly and clearly identify the learning unit designated by the teacher so that the communication between the receiver and the transmitter related to the learning units of the teaching material can be established. Since the communication related to the contents of the teaching material is simplified efficiently, the communication time for teaching and learning can be therefore retrenched. Consequently, the teaching efficiency or learning efficiency can be enhanced. Therein, the transmitter may be a learner or a teacher while the receiver may also be a learner or a teacher.

To achieve the aforesaid advantages, the present invention provides a teaching material having an identification unit. The teaching material comprises at least one learning unit and at least one identification unit, wherein each said identification unit corresponds to a respective said learning unit and each said identification unit has a set of identification unit data. Thereby, a teaching-material communication system can assist a transmitter in designating a learning unit to a receiver, and can assist the receiver in identifying the learning unit designated by the transmitter. Thereupon, the transmitter and the receiver can communicate mutually about the scope of the learning unit.

To achieve the aforesaid advantages, the present invention further provides a teaching-material communication system, which is established in a communication network for assisting at least one transmitter and at least one receiver in communicating mutually about a learning unit of a teaching material having an identification unit. The teaching-material communication system comprises at least one transmitting end system, which includes an input module for inputting a set of identification unit data of the identification unit corresponding to the at least one learning unit of the teaching material designated by the transmitter and outputting the same; a transmission module for receiving the at lest one set of identification unit data output by the input module, so that the transmitter can address a communication demand according to the at least one set of identification unit data and make the communication demand be transmitted to at least one receiving end system via the communication network; and the at least one receiving end system, which includes a receiving module, for receiving the communication demand transmitted from the transmitting end system through the communication network and outputting the same; a second identification process module, for receiving the communication demand output by the receiving module, identifying the at least one learning unit designated by the transmitter according to the at least one set of identification unit data recorded in the communication demand, and performing a process function of assisting communication to output a second identification process result; and a second communication module, for receiving the second identification process result output by the second identification process module, so that the receiver can communicate with the transmitter about the at least one learning unit according to the second identification process result.

To achieve the aforesaid advantages, the present invention further provides a transmitting end system for being used in a teaching-material communication system to connect with at least one receiving end system via a communication network, so as to assist a transmitter in communicating with at least one receiver about a learning unit of a teaching material having an identification unit. The teaching-material communication system comprises an input module, for inputting a set of identification unit data of the identification unit corresponding to the at least one learning unit of the teaching material designated by the transmitter and outputting the same; and a transmission module, for receiving the at least one set of identification unit data output by the input module, so that the transmitter can address a communication demand according to the at least one set of identification unit data and make the communication demand be transmitted to at least one receiving end system via the communication network.

To achieve the aforesaid advantages, the present invention further provides a receiving end system, for being used in a teaching-material communication system to connect with at least one transmitting end system via a communication network, so as to assist a receiver in communicating with at least one transmitter about a learning unit of a teaching material having an identification unit. The receiving end system comprises a receiving module, for receiving the communication demand transmitted from the transmitting end system through the communication network and outputting the same; a second identification process module, for receiving the communication demand output by the receiving module, identifying the at least one learning unit designated by the transmitter according to the at least one set of identification unit data recorded in the communication demand, and performing a process function of assisting communication to output a second identification process result; and a second communication module, for receiving the second identification process result output by the second identification process module, so that the receiver can communicate with the transmitter about the at least one learning unit according to the second identification process result.

To achieve the aforesaid advantages, the present invention further provides a computer program product, for implementing a transmitting end system that is loadable in an information device system configured to execute the transmitting end system, wherein the transmitting end system is configured to connect with at least one receiving end system via a communication network, so as to assist a transmitter in communicating with at least one receiver about a learning unit of a teaching material having an identification unit. The transmitting end system comprises an input module, for inputting a set of identification unit data of the identification unit corresponding to at least one learning unit of the teaching material designated by the transmitter and outputting the same; and a transmission module, for receiving the at least one set of identification unit data output by the input module, so that the transmitter can address a communication demand according to the at least one set of identification unit data, and transmit the communication demand to at least one receiving end system via the communication network.

To achieve the aforesaid advantages, the present invention further provides a computer program product, for implementing a receiving end system that is loadable in an information device system configured to execute the receiving end system, wherein the receiving end system is configured to connect with at least one transmitting end system via a communication network, so as to assist a receiver in communicating with at least one transmitter about a learning unit of a teaching material having an identification unit. The receiving end system comprises a receiving module, for receiving the communication demand transmitted from the transmitting end system through the communication network and outputting the same; a second identification process module, for receiving the communication demand output by the receiving module, identifying the at least one learning unit designated by the transmitter according to the at least one set of identification unit data recorded in the communication demand, and performing a process function of assisting communication to output a second identification process result; and a second communication module, for receiving the second identification process result output by the second identification process module, so that the receiver can communicate with the transmitter about the at least one learning unit according to the second identification process result.

By using the present invention, the following effects can be achieved:

1. Clearness of communication: The present invention permits the transmitter and the receiver to communicate mutually about the learning unit efficiently, so that the uncertainty occurring during the traditional oral communication about the learning unit can be efficiently eliminated.

2. Convenience of operation: The present invention permits the transmitter and the receiver to communicate mutually about the learning unit through the easy operation process of the teaching-material communication system.

3. Customization for conforming to the need: The present invention permits the transmitter to conduct a communication related to a learning unit selected by himself/herself according to his/her need, so that the fixed edition of a learning unit in a traditional teaching unit can be made dynamic and flexible, and the learner's immediate need regarding the learning unit can be satisfied.

4. Advancement of communication efficiency: The present invention permits a unit-based, systematized, and standardized communication process for the learning unit of the teaching material, so that the complex traditional oral communication can be efficiently simplified, and the efficiency of communication and service can be enhanced.

BRIEF DESCRIPTION OF THE DRAWINGS

The invention as well as a preferred mode of use, further objectives and advantages thereof, will be best understood by reference to the following detailed description of an illustrative embodiment when read in conjunction with the accompanying drawings, wherein:

FIG. 3 is a schematic drawing of another embodiment of the teaching-material communication system according to the present invention.

DETAILED DESCRIPTION OF THE PREFERRED EMBODIMENT

Figure 1A:
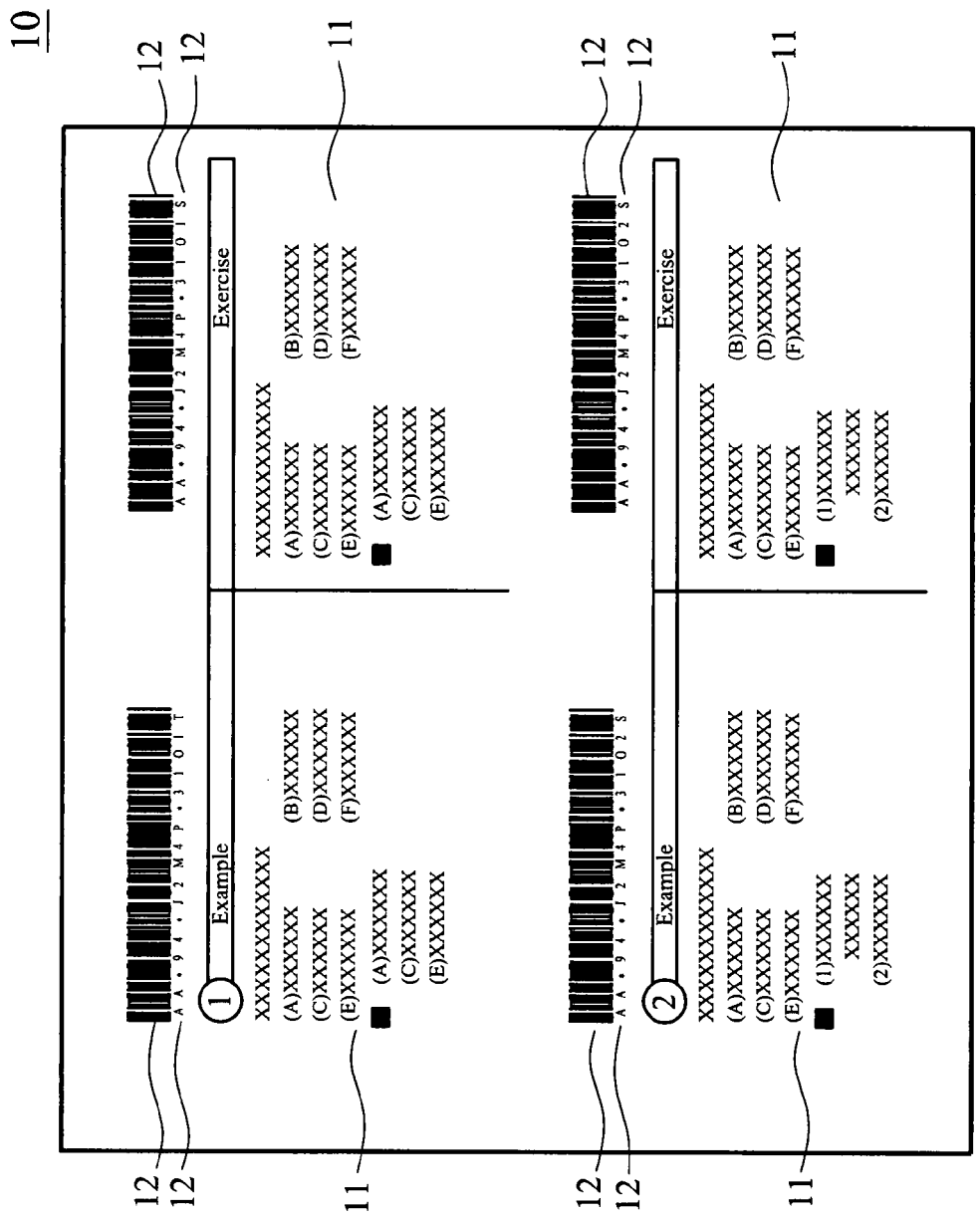
FIG. 1A is a schematic drawing of one embodiment of the teaching material having an identification unit according to the present invention.
Figure 1B:
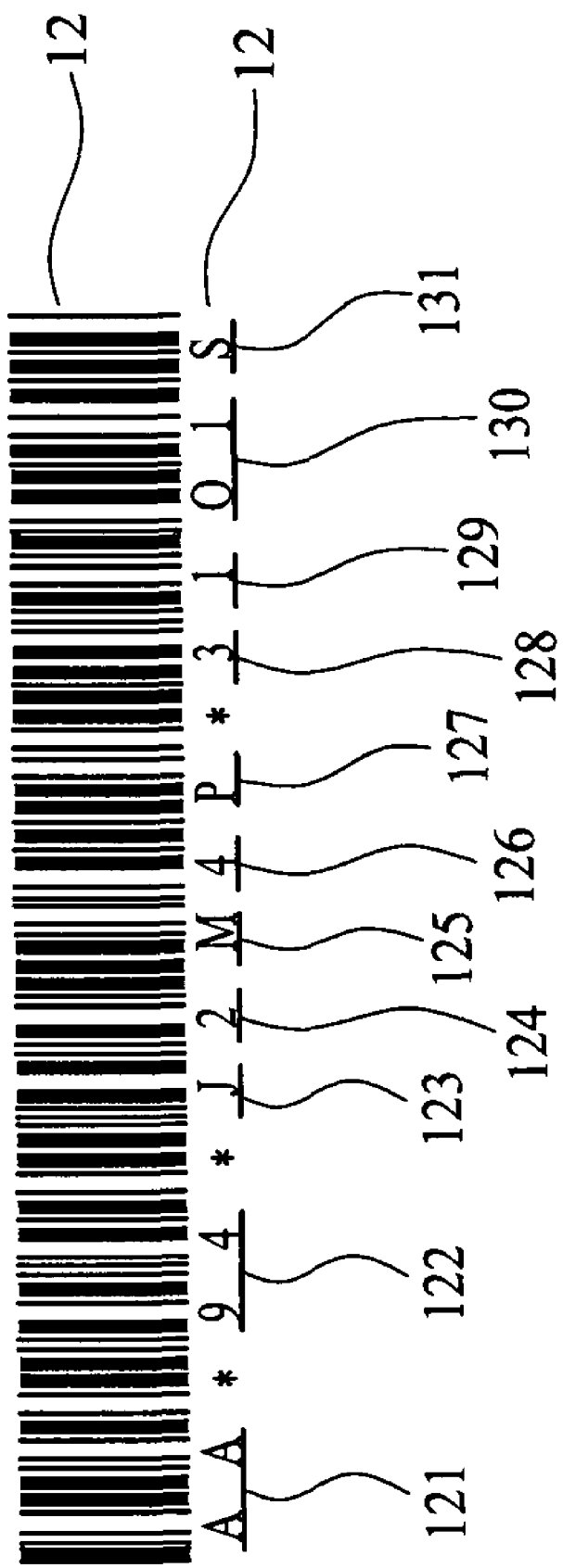
FIG. 1B is a schematic drawing of one embodiment of the identification unit according to the present invention.

FIG. 1A is a schematic drawing of one embodiment of the teaching material 10 having an identification unit 12 according to the present invention. FIG. 1B is a schematic drawing of one embodiment of the identification unit 12 according to the present invention.

The present embodiment is a teaching material 10 having an identification unit 12. A teaching-material communication system 20 can assist a transmitter in designating a learning unit 11 of the teaching material 10 to a receiver, and can assist the receiver in identifying the learning unit 11 designated by the transmitter. Thereupon, the transmitter and the receiver can communicate mutually about the learning unit 11. A teaching material 10 having an identification unit 12 comprises at least one learning unit 11 and at least one identification unit 12.

The teaching material 10, such as a printed teaching materials or a digital teaching material, is created for learning or teaching purposes. The learning unit 11 is a particular scope of the teaching material 10 and may be a chapter, a subject, a formula, an answering guide, or a problem-solving procedure. The transmitter can particularly designate a chapter, a subject, a formula, an answering guide or a problem-solving procedure of the teaching material 10, and conduct communication related thereto with the receiver.

As shown in FIG. 1A, each of the identification unit 12 corresponds to a respective said learning unit 11, and each of the identification unit 12 has a set of identification unit data. The identification unit 12 can be a text code, a barcode, a chip, a magnetic strip or a radio frequency label. The identification unit data of the identification unit 12 are substantially an independent identification code. For obtaining preferable processing efficiency, an encoding rule may be implemented to encapsulate the relevant information of the learning unit 11, such as the metadata of the learning unit 11, into the identification code.

As shown in FIG. 1B, the identification unit 12 is showed as the text code and the barcode. After encoding the identification unit 12, the identification unit data of the identification unit 12 are "AA*94*J2M4P*3101S".

The "AA" represents a publisher code 121.

The "94" represents an academic year code 122.

The "J2M4P" represents the information code of the teaching material 10, wherein the "J" represents an education level code 123 such as junior high school, the "2" represents a grade code 124 such as the second grade, wherein the "M" represents a subject code 125 such as math, the "4" represents a volume code 126 such as the fourth volume, and the "P" represents a material type code 127 such as teaching material handout.

The "3101S" represents the information code of the learning unit 11, wherein the "3" represents a chapter code 128 such as chapter 3, the "1" represents a section code 129 such as section 1, the "01" represents a topic type code 130 such as the first type, and the "S" represents a user code 131 such as student.

Further, by using an automatic identification system technology, such as barcode encoding technology, the identification unit data can be stored in a barcode for being read with a barcode-scanning device. Alternatively, a text code can be read with a text code-scanning device. Thus, the identification unit data can be input into the teaching-material communication system 20 by using a barcode-scanning device or a text code-scanning device for identifying and decoding. Then the teaching-material communication system 20 can perform a process function of assisting communication, such as scheduling or analyzing according to the identification unit data directly.

Moreover, the identification unit 12 may be composed of a plurality of identification sub-units. Each of the identification sub-units has a set of identification sub-unit data, and the identification unit data are composed of the identification sub-unit data. Decomposing the identification unit 12 into the plurality of identification sub-units helps efficiently save the required space for arranging the identification unit 12 in a printed teaching material 10, so that the flexibility of arranging the identification unit data can be enhanced.

Since the automatic identification system technology can contain a large amount of data, the identification unit data can carry more relevant information of the learning unit 11, such as original contents, a service link or metadata for assisting the transmitter and the receiver in accessing and communicating mutually about the original contents of the learning unit 11, or performing the function of assisting communication, such as scheduling or analyzing.

To solve the problem that a transmitter of a conventional digital teaching material cannot identify and acquire the identification data of the identification unit 12, a particular text, a drawing or a dynamic object may be arranged in the browsing picture of the learning units 11 of the digital teaching material for representing an identification unit 12 of the learning unit 11. The identification unit data of the identification unit 12 can be directly embedded into a particular label of a Web page teaching material by using a Web page programming language, such as the Extensible Markup Language (XML), or can be saved independently as a subsidiary file disposed at the back end of the system. Therefore, if the transmitter wants to address a question about the learning unit 11 of the digital teaching material, when he/she sees the particular text or drawing representing the identification unit 12, he/she can use an application of the teaching-material communication system 20 for reading the contents of the particular labels of the learning unit 11 to read the identification unit data corresponding to the identification unit 12. When the transmitter sees the dynamic object, he/she can directly click the same to actuate the application of the system to output the identification unit data corresponding to the identification unit 12 to the teaching-material communication system 20.

Figure 2:
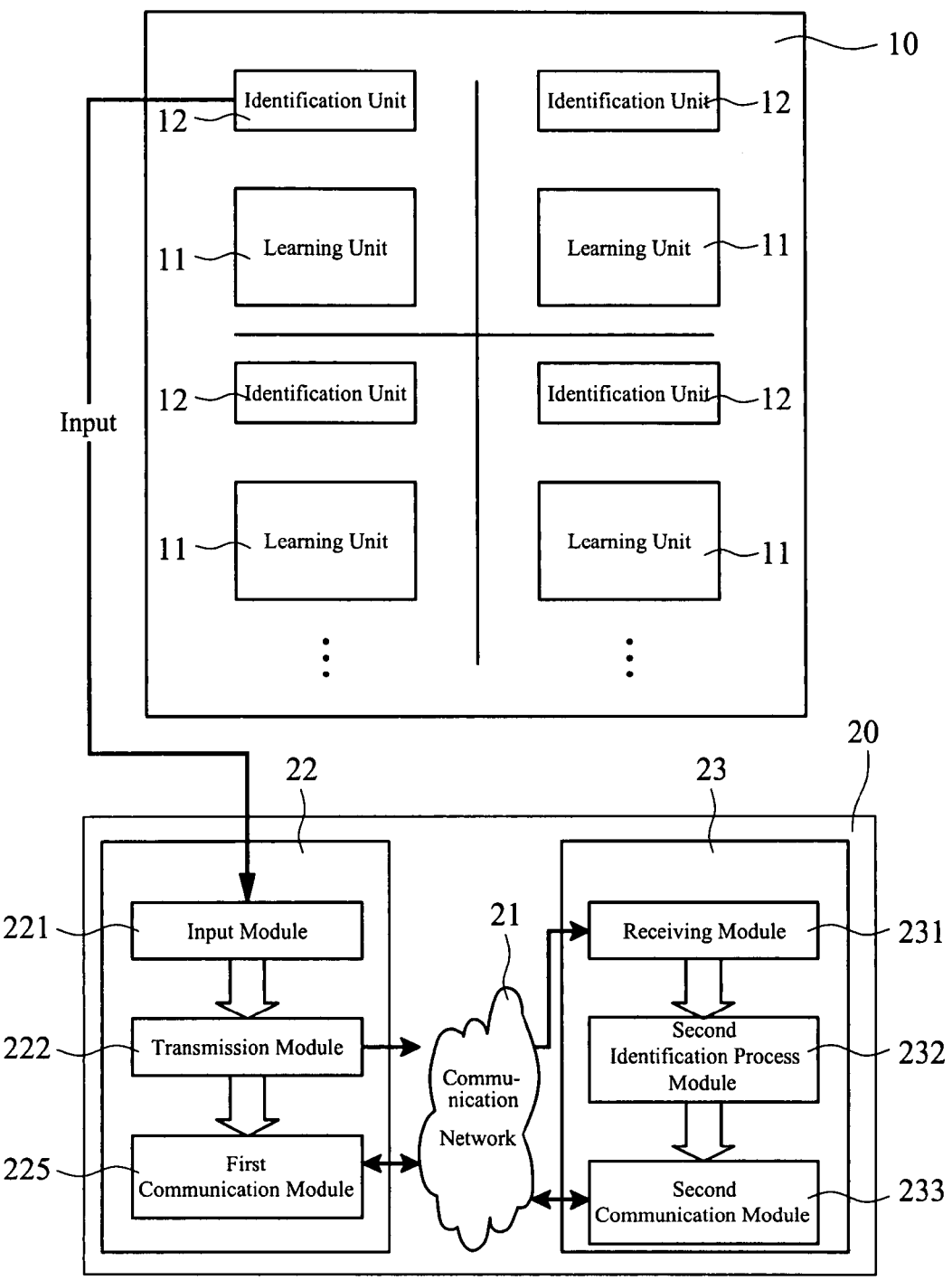
FIG. 2 is a schematic drawing of an embodiment of the teaching-material communication system according to the present invention.

FIG. 2 is a schematic drawing of an embodiment of the teaching-material communication system 20 according to the present invention.

As shown in FIG. 2, a teaching-material communication system 20, which is established in a communication network 21 for assisting at least one transmitter and at least one receiver in communicating mutually about a teaching material 10 having an identification unit 12, comprises at least one transmitting end system 22 and at least one receiving end system 23.

The transmitting end system 22 comprises an input module 221 and a transmission module 222.

The input module 221 is provided for inputting a set of identification unit data of the identification unit 12 corresponding to the at least one learning unit 11 of the teaching material 10 designated by the transmitter, and for outputting the identification unit data to the transmission module 222. Taking a printed teaching-material as an example, when the identification unit 12 of the learning unit 11 is in the form of text code, the input module 221 is an application having an input interface in a computer device or a signal input module of a telephone device. Thereby, the transmitter can use a keyboard of the computer device or keys of the telephone device to input the identification unit data of the learning unit 11 into the transmitting end system 22. When the identification unit 12 of the learning unit 11 is combined with an automatic identification technology, and the identification unit 12 is in the form of a text code, a barcode, a chip or a radio frequency label, the input module 221 is an automatic identification system of a corresponding technology.

Taking a digital teaching-material as an example, when the identification unit data of the learning unit 11 are stored in the Markup Language at the back end of the system, the input module 221 is an application exclusively used for acquiring the contents of a particular label in the Markup Language. Thereby, the transmitter can simply use the application to acquire the identification unit data stored in the particular label from the back end of the system. When the teaching material 10 is equipped with a dynamic object and can output the identification unit data, the input module 221 is an application exclusively used for acquiring the identification unit data output from the dynamic object of the teaching material 10. Thereby, the transmitter can simply execute the dynamic object of the teaching material 10 to output the identification unit data to the input module 221.

The transmission module 222 is provided for receiving the at lest one set of identification unit data output by the input module 221, so that the transmitter can address a communication demand according to the at least one set of identification unit data and transmit the communication demand to at least one receiving end system 23 via the communication network 21. The transmission module 222 can be an application of a computer system exclusively used for transmitting a communication demand, or a signal output module of a telephone device. The transmission module 222 transmits the received identification unit data to the receiving end system 23 through the communication network 21, such as Internet or a telephone network, and addresses the communication demand. A basic communication demand is to directly ask the receiver's immediate response. An advanced communication demand permits the transmitter to set the contents of the communication demand, including the communication object, the communication time, the communication location, the communication device or the communication method, so that the receiver can communicate with the transmitter in compliance with the communication demand.

The at least one receiving end system 23 comprises a receiving module 231, a second identification process module 232, and a second communication module 233.

The receiving module 231 receives the communication demand transmitted from the at lest one transmitting end system 22 through the communication network 21, and outputs the communication demand to the second identification process module 232. When the communication network 21 is a telephone network, the receiving module 231 is a signal-receiving module of a telephone system, such as an automatic voice guide system. When the communication network 21 is the Internet, the receiving module 231 is a Web application, such as a Web server system.

The second identification process module 232 is provided for receiving the communication demand output by the receiving module 231, identifying at least one learning unit 11 designated by the transmitter according to the at least one set of identification unit data recorded in the communication demand, and performing a process function of assisting communication to output a second identification process result. The data source for being used to provide identification can be provided by a teaching-material database or by the identification unit data themselves. The teaching-material database can be disposed in the transmitting end system 22, the receiving end system 23 or a third party system. The scope of the contents to be identified may contain various kinds of relevant information related to the learning unit 11, such as the original contents, service links, or metadata of the learning unit 11.

The process function of assisting communication executed by the second identification process module 232 may be an auxiliary function of viewing the communication demand, or searching for the relevant information related to the learning unit 11. Preferably, the process function of assisting communication executed by the second identification process module 232 further comprises a function of scheduling or a function of analyzing. The function of scheduling provides a schedule program suitable for the transmitter or the receiver. For instance, the function of scheduling may process program scheduling according to the principles including the continuity of the communication process, as well as the subject, the difficulty, and the importance of the learning unit 11. The function of analyzing provides reference for assisting in communication to the transmitter or the receiver. For instance, the function of analyzing permits analysis conducted by using the method of teaching diagnosis, learning diagnosis, statistics, data mining, or provides guide information such as a teaching map or a learning map.

The second communication module 233 is provided for receiving the second identification process result output by the second identification process module 232, so that the receiver can communicate with the transmitter about the at least one learning unit 11 according to the second identification process result. The second communication module 233 further comprises a function of content display, for displaying the second identification process result and for assisting the receiver in communicating with the transmitter about the at least one learning unit 11 according to the contents of the second identification process result. The second communication module 233 further comprises a function of content synchronization for transmitting the second identification process result to a first communication module 225 of the transmitting end system 22 to assist the transmitter in communication. The second communication module 233 further comprises a function of real-time communication. The function of real-time communication may be achieved by providing an application that permits real-time communication, such as MSN messenger, ICQ, Yahoo messenger, QQ, Skype or other user end application for real-time communication. Thereby, the receiver can express his/her real-time communication status and learn the transmitter's real-time communication status. Then the receiver can receive the communication demand addressed by the transmitter and communicate with the transmitter accordingly. Further, the second communication module 233 has a function of group communication that permits the receiver and other receivers to form a receiving group for receiving the communication demand addressed by the transmitter, and permits the receiver to communicate with the transmitter with the receiving group.

FIG. 3 is another schematic drawing of an embodiment of the teaching-material communication system 20 according to the present invention. As shown in FIG. 3, for providing more convenience of the teaching-material communication system 20 to the transmitter, the transmitting end system 22 further comprises a reading module 223, a first identification process module 224, a first communication module 225 and a first operation management module 226.

The reading module 223 permits the transmitter to read the learning unit 11 of the teaching material 10, and assists the transmitter in outputting the identification unit data of the learning unit 11 to the input module 221, so as to simplify the operation originally required by the input module 221.

The first identification process module 224 is provided for receiving the at least one set of the identification unit data output from the input module 221, identifying the at least one learning unit 11 designated by the transmitter according to the at least one set of identification unit data recorded, and performing a process function of assisting communication to output a first identification process result. The data source for being used to provide identification can be provided by a teaching-material database or by the identification unit data themselves. The teaching-material database can be disposed in the transmitting end system 22, the receiving end system 23 or a third party system.

The process function of assisting communication executed by the first identification process module 224 is operated with the principle similar to that of the second identification process module 232, and can also provide auxiliary functions such as viewing the communication demand, searching for the relevant information related to the learning unit 11, performing the function of scheduling and the function of analyzing.

When the transmitting end system 22 is additionally equipped with the first identification process module 224, the transmission module 222 can receive the first identification process result output by the first identification process module 224, and address the communication demand according to the first identification process result. The transmission module 222 can further output the communication demand and the first identification process result to the at least one receiving end system 23. Thereby, the identification work of the second identification process module 232 of the receiving end system 23 can be simplified or omitted so as to reduce the working load of the second identification process module 232. The first communication module 225 is provided for receiving a notice generated by the transmission module 222 after the transmission module 222 has transmitted the communication demand, so that the transmitter can communicate with the receiver about the at least one learning unit 11. The first communication module 225 and the second communication module 233 may transmit information to each other through the communication network 21 in a distance communication mode, for instance. Alternatively, the first communication module 225 and the second communication module 233 may be independent from each other, and each assists the transmitter and the receiver in communicating mutually according to displayed contents in a non-distance communication mode, for instance. The first communication module 225 is operated with the principle similar to that of the second communication module 233, and also provides a function of content display, a function of content synchronization, a function of real-time communication or a function of group communication.

The first operation management module 226 is provided for managing and assisting in the operations required by the operation of the modules of the transmitting end system 22. For example, an identification verification operation management may be provided for verifying whether the transmitter is a legitimate user of the transmitting end system 22, and authorizing the transmitter to use the transmitting end system 22 according to the transmitter's authority; or for verifying whether the receiver is a legitimate communication object. A communication demand operation management may be provided for storing the identification unit data of the input module 221 or the communication demand output from the transmission module 222, and for assisting the first identification process module 224 in carrying out scheduling and analyzing. Also, a teaching-material database operation management may be provided for allowing the first identification process module 224 to search the relevant information and contents of the learning unit 11 according to the identification unit data, or for supporting the first communication module 225 to display the relevant information of the learning unit 11.

Furthermore, the first operation management module 226 can conduct collaboration work with an external system according to the need of the operation management. The external system can include the receiving end system 23, other transmitting end systems 22 or a third party system. The collaboration work may, for instance, comprise a teaching-material database updating operation for maintaining the consistency between the teaching-material databases of the transmitting end system 22 and the receiving end system 23, so as to ensure the precision of the searching and accessing of the teaching-material. The collaboration work may, for instance, comprise a communication demand diversion operation for permitting the transmitter to divert the communication demand from the transmitting end system 22 to another transmitting end system 22, so that the transmitter can conduct communication with an appropriate system device under an appropriate condition. The collaboration work may, for instance, comprise a real-time communication collaboration operation for enabling real-time communication of the first communication module 225 and the collaboration work on a real-time communication server end system; or a group communication collaboration operation for enabling group communication of the first communication module 225 and the collaboration work on other transmitting end system 22.

The transmitting end system 22 is stored in a computer program product for loading in an information device system, so that the information device system can execute the transmitting end system 22. The information device system can be, for instance, a computer device, a telephone device, an automatic identification device, an electronic schoolbag, or a mobile communication device, such as a mobile phone or a personal digital assistant (PDA).

For providing more convenient use of the teaching-material communication system 20 to the receiver, the receiving end system 23 further comprises a second operation management module 234.

The second operation management module 234 is provided for managing and assisting in the operations required by the operation of the modules of the receiving end system 23. The operations may be, for example, similar to those of the first operation management module 226 such as identification verification operation management, communication demand operation management, or teaching-material database operation management.

Also, the second operation management module 234 can conduct collaboration work with an external system according to the need of the operation management. The external system can include the transmitting end system 22, other receiving end systems 23 or a third party system. The collaboration work is operated under the principle similar to that of the first operation management module 226, and provides a teaching-material database updating operation, a communication demand diversion operation, a real-time communication collaboration operation or a group communication collaboration operation.

The said receiving end system 23 is stored in a computer program product for loading in an information device system, so that the information device system can execute the receiving end system 23. The information device system can be, for instance, a computer device, a telephone device, an automatic identification device, an electronic schoolbag, or a mobile communication device, such as a mobile phone or a personal digital assistant.

The First Embodiment

Further, by applying the structure and concept of the aforesaid teaching-material communication system 20 to interactive teaching service, a new mode of teaching service can be created. The teaching service can be divided into a passive type and an active type subject to that the teacher who provides the teaching service plays the role as a receiver or a transmitter.

In the passive-type teaching service, the transmitter is a learner while the receiver is a teacher, and the teaching service is provided to the learner by the teacher passively, and the teaching-material communication system 20 is a passive-type teaching service communication system. The original communication demand in the teaching-material communication system 20 is a teaching service demand; the original transmitting end system 22 is a learning end system; and the original receiving end system 23 is a teaching end system. Preferably, in the passive-type teaching service communication system, the teaching service that the teacher provides to the learner may include three modes, which are distance learning, on-the-spot teaching and dispatched teaching.

On the contrary, in the active-type teaching service, the transmitter is a teacher while the receiver is a learner and the teaching service is provided to the learner by the teacher actively, and the teaching-material communication system 20 is an active-type teaching service communication system. The original communication demand in the teaching-material communication system 20 is a teaching service notice; the original transmitting end system 22 is a teaching end system; and the original receiving end system 23 is a learning end system. In the active-type teaching service communication system, the teaching service that the teacher provides to the learner may also include three modes that are distance learning, on-the-spot teaching and dispatched teaching.

Preferably, the said passive-type teaching service communication system and active-type teaching service communication system can be applied to class teaching, which is achieved by integrating at least one teaching end system and a plurality of learning end system in a class teaching environment through a communication network.

The Second Embodiment

Further, by applying the structure and concept of the aforesaid teaching-material communication system 20 to interactive teaching-material application service, a new mode of teaching-material application service can be created. The teaching-material application service can be divided into a passive type and an active type subject to that the teacher who provides the teaching service plays the role as a receiver or a transmitter. The teaching-material application service can be, for instance, a teaching-material reading service, a teaching-material dialoguing service, a teaching-material publishing service, a teaching ability measuring service, a learning ability measuring service, a teaching matching service, a learning diagnosis service, a teaching-material evaluating service, a teaching-material searching service, a teaching-material downloading service, a teaching-material trading service, a teaching-material broadcasting service, a teaching-material printing service, a learning or teaching Web log service, a knowledge sharing service, or a teaching-material creating service. The knowledge sharing service may be, for instance, Yahoo! Knowledge+. The teaching-material creating service may be, for instance, the Web-based Wikipedia.

In the passive-type teaching service, the transmitter is a demander; while the receiver is a server, and the teaching-material application service is provided to the demander by the server passively; the teaching-material communication system 20 is a passive-type teaching-material application service communication system. The original communication demand in the teaching-material communication system 20 is a teaching-material application service demand; the original transmitting end system 22 is a demanding end system; and the original receiving end system 23 is a serving end system.

On the contrary, in the active-type teaching service, the transmitter is a server; while the receiver is a demander, and the teaching-material application service is provided to the demander by the server actively; the teaching-material communication system 20 is an active-type teaching-material service communication system. The original communication demand in the teaching-material communication system 20 is a teaching-material application service notice; the original transmitting end system 22 is a serving end system; and the original receiving end system 23 is a demanding end system.

Although the particular embodiments of the invention have been described in details for the purpose of illustration, it will be understood by one of ordinary skill in the art that numerous variations will be possible to the disclosed embodiments without going outside the scope of the invention as disclosed in the claims.

What is claimed is:

1. A teaching material having an identification unit, comprising:
   at least one learning unit; and
   at least one identification unit, wherein each said identification unit corresponds to a respective said learning unit and each said identification unit has a set of identification unit data;
   whereby a communication system can assist a transmitter in designating a learning unit to a receiver, and can assist the receiver in identifying the learning unit designated by the transmitter, thereupon, the transmitter and the receiver can conduct mutual communication related to the learning unit.

2. A teaching-material communication system, which is established in a communication network for assisting at least one transmitter and at least one receiver in communicating mutually about a learning unit of a teaching material having an identification unit, comprising:
   at least one transmitting end system, which includes:
   an input module for inputting a set of identification unit data of the identification unit corresponding to the at least one learning unit of the teaching material designated by the transmitter and outputting the same; and
   a transmission module for receiving the at least one set of identification unit data output by the input module, so that the transmitter can address a communication demand according to the at least one set of identification unit data, and transmit the communication demand to at least one receiving end system via the communication network; and
   at least one receiving end system, which includes:
   a receiving module, for receiving the communication demand transmitted from the transmitting end system through the communication network and outputting the same;
   a second identification process module, for receiving the communication demand output by the receiving module, identifying at least one learning unit designated by the transmitter according to the at least one set of identification unit data recorded in the communication demand, and performing a process function of assisting communication to output a second identification process result; and
   a second communication module, for receiving the second identification process result output by the second identification process module, so that the receiver can communicate with the transmitter about the at least one learning unit according to the second identification process result.

3. The teaching-material communication system of claim 2, wherein the transmitting end system further comprises a reading module that permits the transmitter to read the learning unit, and assists the transmitter in outputting the identification unit data of the learning unit to the input module.

4. The teaching-material communication system of claim 2, wherein the transmitting end system further comprises a first identification process module for receiving the at least one set of the identification unit data output from the input module, identifying the at least one learning unit designated by the transmitter according to the at least one set of identification unit data, and performing a process function of assisting communication to output a first identification process result to the transmission module.

5. The teaching-material communication system of claim 2, wherein the transmitting end system further comprises a first communication module for receiving a notice generated by the transmission module after the transmission module has transmitted the communication demand, so that the transmitter can communicate with the receiver about the at least one learning unit.

6. The teaching-material communication system of claim 2, wherein the transmitting end system further comprises a first operation management module for managing and assisting in operations required by the operation of the modules of the transmitting end system, and for conducting collaboration work with an external system according to the need of the operation management.

7. The teaching-material communication system of claim 2, wherein the receiving end system further comprises a second operation management module for managing and assisting in operations required by the operation of the modules of the receiving end system, and for conducting collaboration work with an external system according to the need of the operation management.

8. A transmitting end system, for being used in a teaching-material communication system to connect with at least one receiving end system via a communication network, so as to assist a transmitter in communicating with at least one receiver about a learning unit of a teaching material having an identification unit, comprising:
  an input module, for inputting a set of identification unit data of the identification unit corresponding to at least one learning unit of the teaching material designated by the transmitter and outputting the same; and
  a transmission module, for receiving the at least one set of identification unit data output by the input module, so that the transmitter can address a communication demand according to the at least one set of identification unit data, and transmit the communication demand to at least one receiving end system via the communication network.

9. The transmitting end system of claim 8, further comprising a reading module that permits the transmitter to read the learning unit, and assists the transmitter in outputting the identification unit data of the learning unit to the input module.

10. The transmitting end system of claim 8, further comprising a first identification process module for receiving the at least one set of the identification unit data output from the input module, identifying the at least one learning unit designated by the transmitter according to the at least one set of identification unit data, and performing a process function of assisting communication to output a first identification process result to the transmission module.

11. The transmitting end system of claim 8, further comprising a first communication module for receiving a notice generated by the transmission module after the transmission module has transmitted the communication demand, so that the transmitter can communicate with the receiver about the at least one learning unit.

12. The transmitting end system of claim 8, further comprising a first operation management module for managing and assisting in operations required by the operation of the modules of the transmitting end system, and for conducting collaboration work with an external system according to the need of the operation management.

13. A receiving end system, for being used in a teaching-material communication system to connect with at least one transmitting end system via a communication network, so as to assist a receiver in communicating with at least one transmitter about a learning unit of a teaching material having an identification unit, comprising:
  a receiving module, for receiving the communication demand transmitted from the transmitting end system through the communication network and outputting the same;
  a second identification process module, for receiving the communication demand output by the receiving module, identifying the at least one learning unit designated by the transmitter according to the at least one set of identification unit data recorded in the communication demand, and performing a process function of assisting communication to output a second identification process result; and
  a second communication module, for receiving the second identification process result output by the second identification process module, so that the receiver can communicate with the transmitter about the at least one learning unit according to the second identification process result.

14. The receiving end system of claim 13, further comprising a second operation management module for managing and assisting in operations required by the operation of the modules of the receiving end system, and for conducting collaboration work with an external system according to the need of the operation management.

15. A non-transitory computer readable medium in which is stored a transmitting end system that is loadable in an information device system configured to execute the transmitting end system, wherein the transmitting end system is configured to connect with at least one receiving end system via a communication network, so as to assist a transmitter in communicating with at least one receiver about a learning unit of a teaching material having an identification unit, comprising:
  an input module, for inputting a set of identification unit data of the identification unit corresponding to at least one learning unit of the teaching material designated by the transmitter and outputting the same; and
  a transmission module, for receiving the at least one set of identification unit data output by the input module, so that the transmitter can address a communication demand according to the at least one set of identification unit data, and transmit the communication demand to at least one receiving end system via the communication network.

16. The non-transitory computer readable medium of claim 15, wherein the receiving end system further comprises a reading module that permits the transmitter to read the learning unit, and assists the transmitter in outputting the identification unit data of the learning unit to the input module.

17. The non-transitory computer readable medium of claim 15, wherein the receiving end system further comprises a first identification process module for receiving the at least one set of the identification unit data output from the input module, identifying the at least one learning unit designated by the transmitter according to the at least one set of identification unit data, and performing a process function of assisting communication to output a first identification process result to the transmission module.

18. The non-transitory computer readable medium of claim 15, wherein the receiving end system further comprises a first communication module for receiving a notice generated by the transmission module after the transmission module has transmitted the communication demand, so that the transmitter can communicate with the receiver about the at least one learning unit.

19. The non-transitory computer readable medium of claim 15, wherein the receiving end system further comprises a first operation management module for managing and assisting in operations required by the operation of the modules of the transmitting end system, and for conducting collaboration work with an external system according to the need of the operation management.

20. A non-transitory computer readable medium in which is stored a receiving end system that is loadable in an information device system configured to execute the receiving end system, wherein the receiving end system is configured to connect with at least one transmitting end system via a communication network, so as to assist a receiver in communicating with at least one transmitter about a learning unit of a teaching material having an identification unit, comprising:

a receiving module, for receiving the communication demand transmitted from the transmitting end system through the communication network and outputting the same;

a second identification process module, for receiving the communication demand output by the receiving module, identifying the at least one learning unit designated by the transmitter according to the at least one set of identification unit data recorded in the communication demand, and performing a process function of assisting communication to output a second identification process result; and a second communication module, for receiving the second identification process result output by the second identification process module, so that the receiver can communicate with the transmitter about the at least one learning unit according to the second identification process result.

21. The non-transitory computer readable medium of claim 20, wherein the receiving end system further comprises a second operation management module for managing and assisting in operations required by the operation of the modules of the receiving end system, and for conducting collaboration work with an external system according to the need of the operation management.

* * * * *